United States Patent
Cakmak

(10) Patent No.: US 11,732,382 B2
(45) Date of Patent: Aug. 22, 2023

(54) ROLL-TO-ROLL MANUFACTURING MACHINES AND METHODS FOR PRODUCING NANOSTRUCTURE-CONTAINING POLYMER FILMS

(71) Applicant: Purdue Research Foundation, West Lafayette, IN (US)

(72) Inventor: Mukerrem Cakmak, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 576 days.

(21) Appl. No.: 16/338,529

(22) PCT Filed: Oct. 26, 2017

(86) PCT No.: PCT/US2017/058423
§ 371 (c)(1),
(2) Date: Apr. 1, 2019

(87) PCT Pub. No.: WO2018/081357
PCT Pub. Date: May 3, 2018

(65) Prior Publication Data
US 2019/0249336 A1    Aug. 15, 2019

Related U.S. Application Data

(60) Provisional application No. 62/412,898, filed on Oct. 26, 2016.

(51) Int. Cl.
*B29C 41/28*    (2006.01)
*D01D 5/00*    (2006.01)
(Continued)

(52) U.S. Cl.
CPC ......... *D01D 5/0007* (2013.01); *B29C 39/146* (2013.01); *B29C 39/18* (2013.01);
(Continued)

(58) Field of Classification Search
CPC ......... B29C 39/18; B29C 41/28; B29C 59/10; B29C 71/0072; B29C 48/35
See application file for complete search history.

(56) References Cited

U.S. PATENT DOCUMENTS

| 2003/0165746 A1 | 9/2003 | Stadler et al. |
| 2009/0161214 A1 | 6/2009 | Nakai |

(Continued)

OTHER PUBLICATIONS

M. Cakmak et al., Field Assisted Self-Assembly for Preferential Through Thickness ("z-Direction") Alignment of Particles and Phases by Electric, Magnetic, and Thermal Fields Using a Novel Roll-to-Roll Processing Line, Polym Eng. Sci., (2015) pp. 34-46.
(Continued)

*Primary Examiner* — Alison L Hindenlang
*Assistant Examiner* — Alexander A Wang
(74) *Attorney, Agent, or Firm* — Hartman Global IP Law; Gary M. Hartman; Domenica N.S. Hartman

(57) ABSTRACT

A roll-to-roll manufacturing machine suitable for processing and producing polymer films that contain nanostructures, including but not limited to multifunctional polymer films. The machine applies a liquid polymer on a substrate to form a liquid polymer film, at least partially embeds nanostructures into the liquid polymer film, melt casts a layer of a molten polymer on the liquid polymer film to produce a thin polymer film, organizes the nanostructures in a thickness direction of the thin polymer film comprising applying an electric field to the thin polymer film, aligns the nanostructures in the thin polymer film by simultaneously subjecting the thin polymer film to heat and a field that aligns the nanostructures, and solidifies the thin polymer film to freeze
(Continued)

the nanostructures along nanocolumns in a thickness direction of a solidified polymer film resulting therefrom.

9 Claims, 13 Drawing Sheets

(51) Int. Cl.
    *B29C 39/14*      (2006.01)
    *B29C 39/18*      (2006.01)
    *B29C 59/04*      (2006.01)
    *B32B 27/00*      (2006.01)
    *B05C 5/02*      (2006.01)
    *B05C 11/04*      (2006.01)
    *B82Y 40/00*      (2011.01)
    *B29C 59/02*      (2006.01)
    *B05C 5/00*      (2006.01)

(52) U.S. Cl.
    CPC ............ *B29C 41/28* (2013.01); *B29C 59/046* (2013.01); *B32B 27/00* (2013.01); *B05C 5/00* (2013.01); *B05C 5/0245* (2013.01); *B05C 11/04* (2013.01); *B29C 2059/023* (2013.01); *B82Y 40/00* (2013.01)

(56) References Cited

U.S. PATENT DOCUMENTS

| | | | |
|---|---|---|---|
| 2010/0004388 A1* | 1/2010 | Farmer | B82Y 30/00 |
| | | | 524/592 |
| 2011/0212321 A1 | 9/2011 | Cakmak et al. | |
| 2012/0135156 A1* | 5/2012 | Cakmak | B29C 41/28 |
| | | | 427/508 |
| 2015/0367540 A1 | 12/2015 | Johnson et al. | |

OTHER PUBLICATIONS

International Search Report and Written Opinion for International Application No. PCT/US2017/058423, dated Feb. 6, 2018, 16 pages.

* cited by examiner

ROLL-TO-ROLL MANUFACTURING MACHINES AND METHODS FOR PRODUCING NANOSTRUCTURE-CONTAINING POLYMER FILMS

BACKGROUND OF THE INVENTION

The present invention generally relates to processes and equipment for producing polymer films that may contain nanostructured phases/particles of a variety of material forms, including but not limited to polymers, inorganic materials, metals, metal alloys, and discrete phases of rigid and deformable materials of the same. The invention particularly relates to processes and equipment for producing multifunctional polymer films and porous substrates (e.g., paper, ceramic, polymer foam) that contain these nanostructures oriented along the thickness direction (sometimes referred to herein as the "z-direction") of the films.

Multifunctional polymers have molecular architectures and properties that enable their use for analytical, sensing, and various other applications when applied to substrates. As nonlimiting examples, chemical, biochemical, and biological groups can interact with multifunctional polymers for the purpose of detecting and quantifying certain target molecules in a material. There is an ever increasing need for multifunctional polymer films suitable for use in a variety of applications, including but not limited to sensors, flexible electronics (for example, liquid crystal displays (LCDs), plasma displays (PDs), touch panels, organic light emitting diodes (OLEDs), photovoltaics, separation membranes, fuel cell membranes, magnetic recording media, etc. Such polymer films are often referred to as hybrid polymer films and contain electrically conductive particles, fibers, etc., to achieve various characteristics desired for particular applications, for example, flexibility, elasticity, transparency, electrical conductivity, etc. Hybrid polymer films containing nanoparticles have become of particular interest. As used herein, "nanoparticles" will refer to nanomaterials (0D, 1D, 2D, and 3D materials) having at least one dimension of less than a micrometer, a particular example of which is nanofibers (1D nanomaterials).

Several patent documents and technical publications that relate to machines and processes capable of producing functional polymer films include the following: U.S. Patent Application Publication 2012/0153236; Y. Chen et al., "Large-scale R2R fabrication of piezoresistive films (Ni/PDMS) with enhanced through thickness electrical and thermal properties by applying a magnetic field," RSC Adv., 2015, 5, 92071-92079; Y. Chen et al., "Transparent and through thickness conductive polystyrene films using external magnetic fields for "Z" alignment of nickel nanoparticles," Nanoscale, 2015, 7, 14636-14632; and M. Cakmak et al., "Field Assisted Self-Assembly for Preferential Through Thickness ("z-Direction") Alignment of Particles and Phases by Electric, Magnetic, and Thermal Fields Using a Novel Roll-to-Roll Processing Line," Polym. Eng. Sci., 55:34-46, 2015. The contents of these listed documents and publications are incorporated herein by reference.

BRIEF DESCRIPTION OF THE INVENTION

The present invention provides a roll-to-roll manufacturing machine suitable for processing and producing polymer films that contain nanostructures, including but not limited to multifunctional polymer films.

According to one aspect of the invention, the machine includes means for applying a liquid polymer on a substrate to form a liquid polymer film, means for at least partially embedding nanostructures into the liquid polymer film, means for melt casting a layer of a molten polymer on the liquid polymer film to produce a thin polymer film, means for organizing the nanostructures in a thickness direction of the thin polymer film comprising applying an electric field to the thin polymer film, means for aligning the nanostructures in the thin polymer film by simultaneously subjecting the thin polymer film to heat and a field that aligns the nanostructures, and means for solidifying the thin polymer film to freeze the nanostructures along nanocolumns in a thickness direction of a solidified polymer film resulting therefrom.

According to another aspect of the invention, a process is provided that includes applying a liquid or molten polymer on a substrate to form a thin polymer film, optionally at least partially embedding nanostructures into the thin polymer film, and laser heating and then solidifying the thin polymer film to effect directional crystallization so that the thin polymer film has highly directional properties as a result of a generated directional morphology.

Technical aspects of the roll-to-roll manufacturing machine and process described above preferably include the capability of having multiple process features for scale up to produce a wide variety of multifunctional films and membranes, nonlimiting examples of which include nanofiber mat generation and nanofiber functionalized films and membranes. The machine can be used to achieve nanostructure alignment in the thickness ("z") direction of a film by application of an external field in polymers, solutions, monomers, and melts using electric, magnetic, and/or thermal gradient fields that can be affected by laser heating to preferentially increase electric, magnetic, dielectric and various other properties of a film primarily in the thickness direction. Alignment of the nanostructures can achieve significant improvements in directional physical properties, and allows multifunctional films to exhibit desirable properties for their intended applications while incorporating relatively low concentrations of nanostructures. A particular aspect is the ability to perform nanostructure alignment and directional crystallization while the polymer is in the molten phase, eliminating the need to use solvents that can detrimentally affect the desired properties of the film. By avoiding the use of solvents to dissolve polymers and nanostructures used to produce multifunctional films and membranes, a more environmentally friendly process results. In addition, the machine also allows for the production of multifunctional films and membranes from polymers that may only be processed by melt processing, for example, thermoplastics.

Other aspects and advantages of this invention will be further appreciated from the following detailed description.

DETAILED DESCRIPTION OF THE INVENTION

Figure 1:
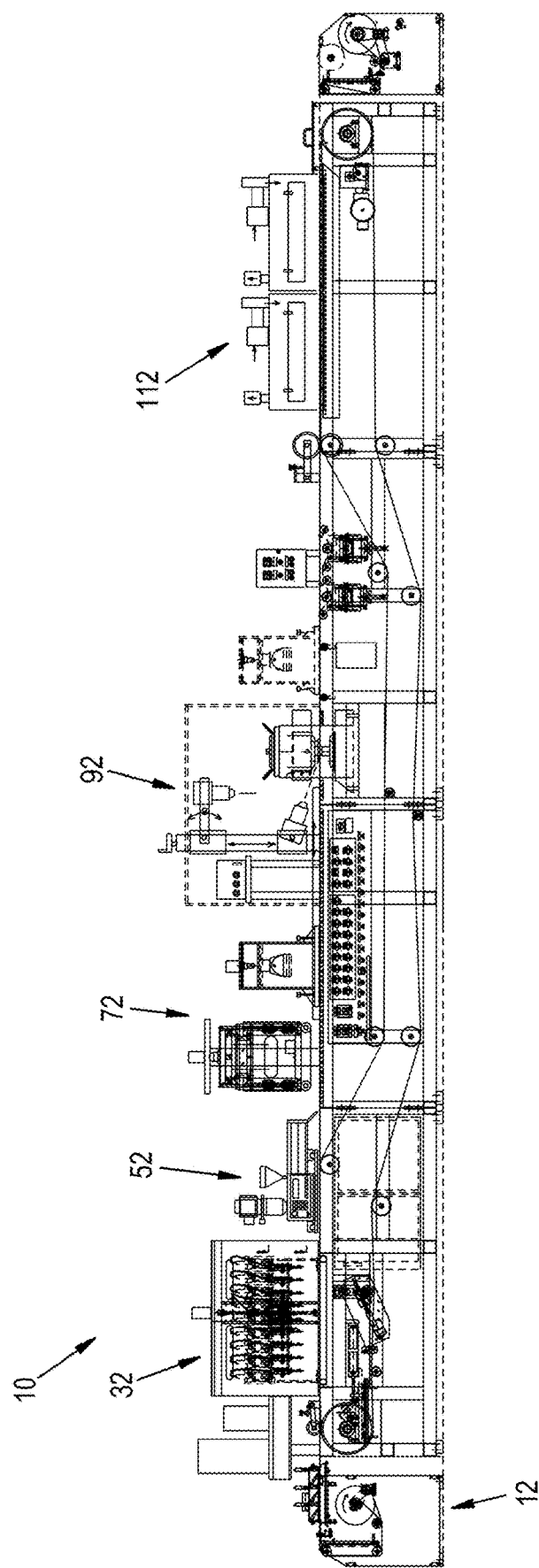
FIG. 1 is a schematic side view of a roll-to-roll manufacturing machine suitable for processing and producing multifunctional polymer films in accordance with a nonlimiting embodiment of this invention.

FIGS. 1 through 14 represent various views of a roll-to-roll manufacturing machine 10 suitable for processing and producing polymer films, including but not limited to multifunctional polymer films, that contain nanostructures, including but not limited to nanoparticles and/or nanostructured phases, in accordance with a nonlimiting embodiment of this invention. Although the invention will be described hereinafter in reference to particular features and functions schematically identified in the drawings, it should be noted that the teachings of the invention are not limited to these particular features or functions, and the invention does not require all of the features, functions, or the interfunctionality represented in the drawings. Furthermore, FIGS. 1 through 14 are drawn for purposes of clarity when viewed in combination with the following description, and therefore are not necessarily to scale.

To facilitate the description provided below of the embodiment represented in the drawings, relative terms, including but not limited to, Avertical,@ Ahorizontal,@ Alateral, @ Afront,@ Arear,@ Aside, @ Aforward,@ Are arward, @ Aupper,@ Alower,@ Aabove,@ Abelow,@ Aright,@ Aleft,@ etc., may be used in reference to the orientation of the machine 10 as represented in the drawings, and therefore are relative terms that are useful to describe the machine 10 represented in the drawings, but should not be necessarily interpreted as limiting the scope of the invention.

According to a preferred but nonlimiting aspect, the machine 10 represented in FIGS. 1 through 14 is preferably capable of accepting any liquid form of essentially any polymer (or monomer forms thereof) as precursors, including but not limited to polymer solutions, monomers, and polymer melts. The ability of processing polymer melts, for example, molten thermoplastics, is particularly notable since it is believed that polymer melts have not been implemented in roll-to-roll manufacturing platforms of the type disclosed in the documents and publications noted above as being incorporated herein by reference.

Figure 3:
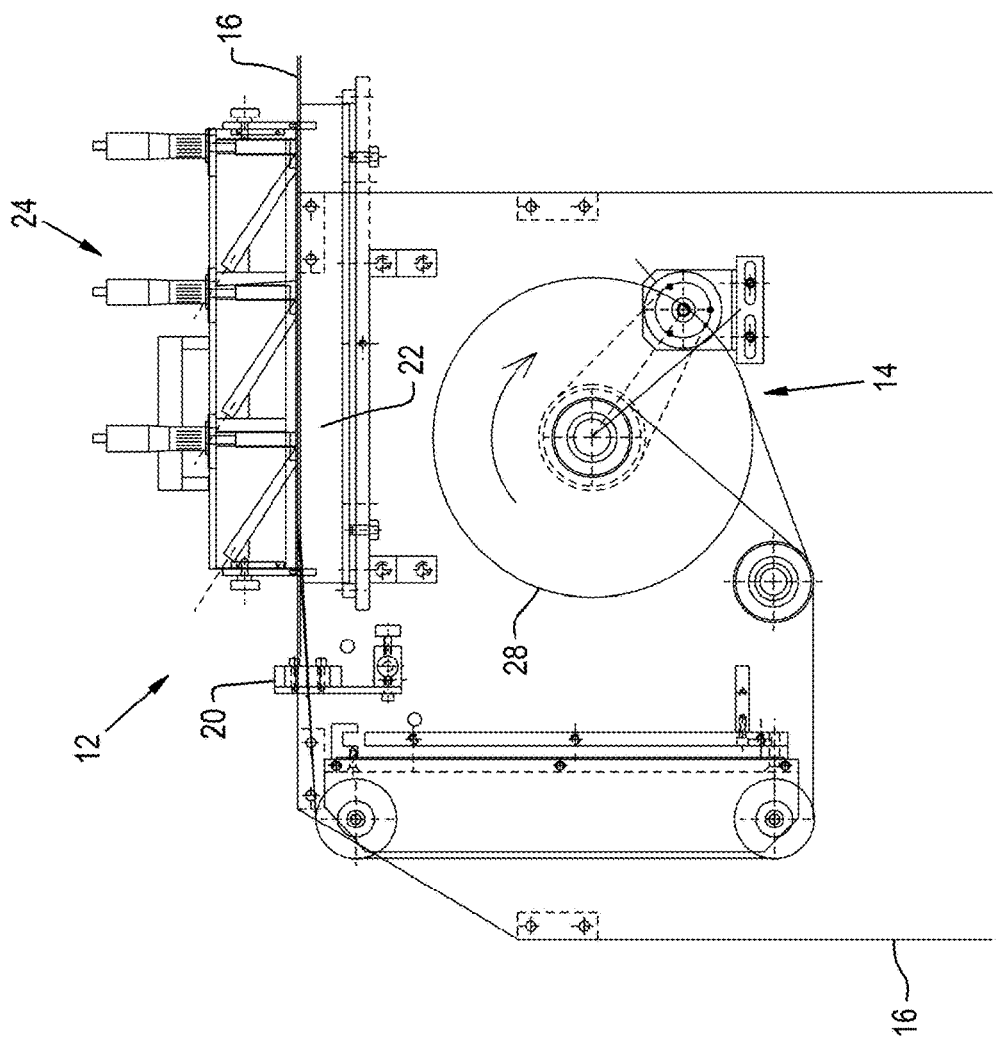
FIGS. 2 and 3 are, respectively, isolated and detailed views of an unwind and solution casting zone of the manufacturing machine of FIG. 1.
Figure 2:
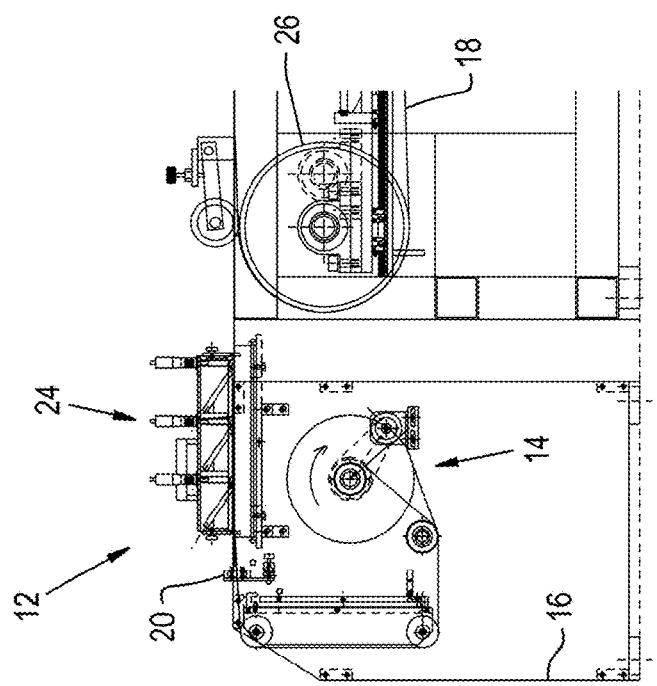
Figure 14:
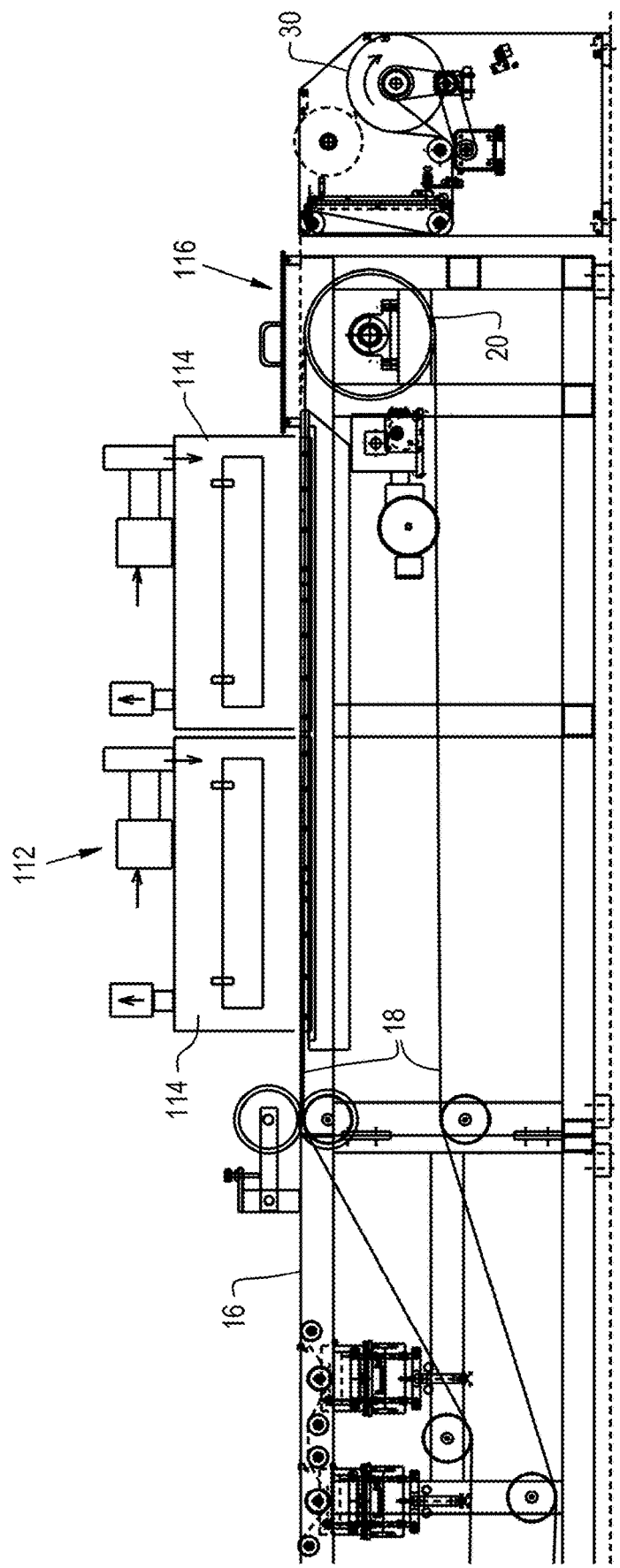
FIG. 14 is an isolated view of a thermal treatment zone of the manufacturing machine of FIG. 1.

Certain sections, components, and functions of the manufacturing machine 10 and their potential uses will be described below in reference to zones identified in FIG. 1 with reference numbers 12, 32, 52, 72, 92, and 112. Zone 12 (details of which are shown in FIGS. 2 and 3) is an unwind and solution casting zone shown as including a film unwind section 14 adapted to deliver a substrate 16 onto a moving carrier 18, as a nonlimiting example, a stainless steel belt driven between a pair of spools 26 (FIGS. 2, 3, and 14). The substrate 16 may be a polymer, metal, or combination of both, and is depicted in the drawings as being unwound from a feed spool 28 and drawn through the machine by a rewind spool 30 (FIG. 14). The machine 10 is preferably equipped with edge sensors 20 and configured to continuously adjust the substrate 16 to ensure it remains in its intended tracks within the machine 10. The substrate 16 is represented as traveling across an ultra-flat granite section 22 on which a polymer casting process may be performed, which in the nonlimiting embodiment shown in the drawings utilizes a coating unit 24 comprising multiple doctor blades. The polymer casting process is preferably capable of delivering and applying one or more layers of liquid polymer (monomer or polymer solution) onto the substrate 16 to form a liquid polymer film. Nonlimiting examples of suitable polymers for this step include photocurable monomers, thermally curable monomers, etc., and are capable of being mixed with additives and nanoparticles and/or polymer mixtures to enhance one or more functional properties of the film. Other aspects of polymer casting that may be utilized by the present invention are generally known in the art, as evidenced by the documents and publications noted above as being incorporated herein by reference.

Figure 4:
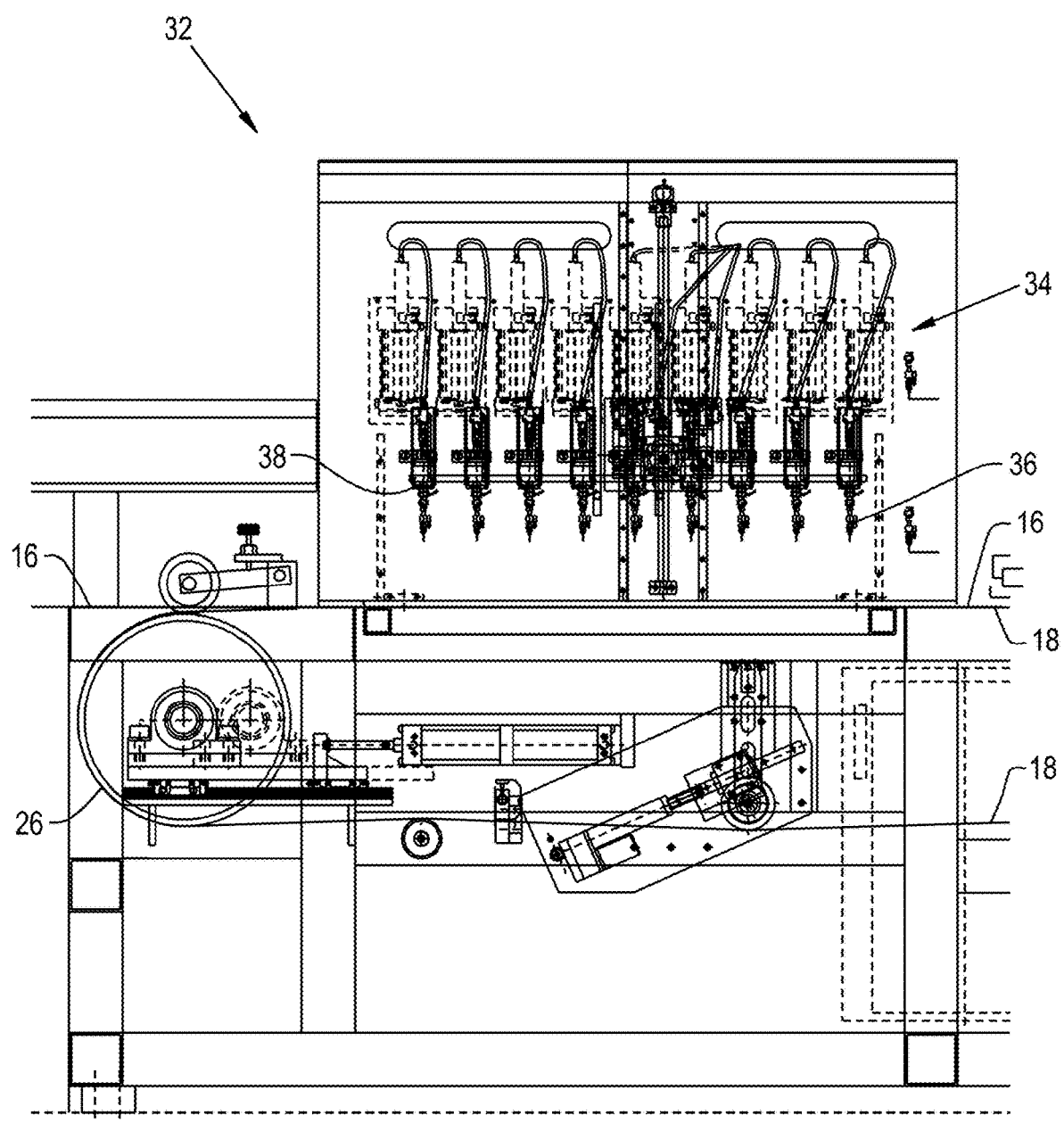
FIGS. 4 and 5 are, respectively, isolated and detailed views of an electrospinning zone of the manufacturing machine of FIG. 1.
Figure 5:
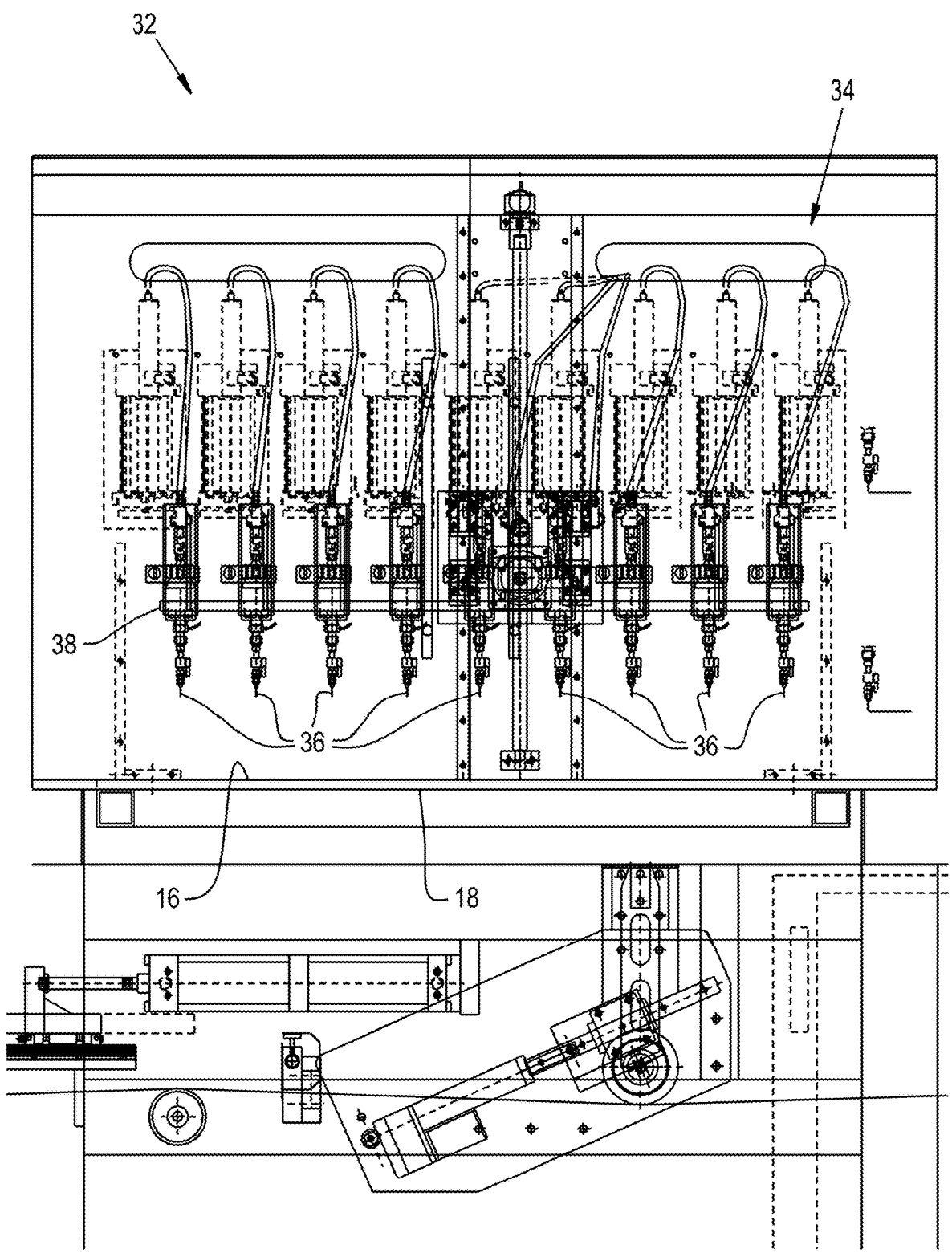
Figure 16:
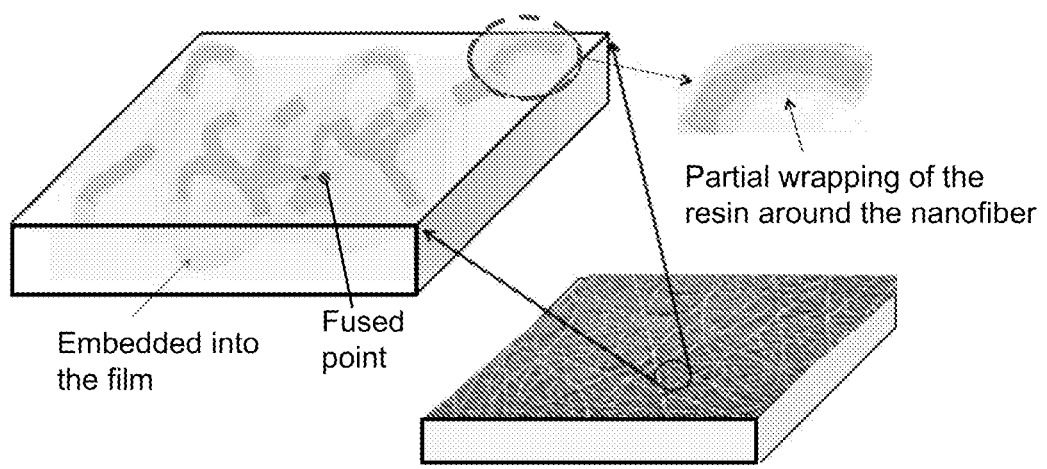
FIGS. 16 and 17 contain schematics and images of polymer films of types capable of being processed or produced with the manufacturing machine of FIG. 1.

Zone 32 (details of which are shown in FIGS. 4 and 5) is an electrospinning zone of the machine 10 that deposits nanostructures and optionally other additives and/or polymer mixtures that are preferably capable of enhancing one or more functional properties of the film so that the machine 10 produces a multifunctional film. If the substrate 16 already carries a liquid polymer film as a result of the polymer casting process being performed in the unwind and solution casting zone 12, the deposition process combines the nanostructures with the liquid polymer film. Alternatively, the nanostructures may be deposited directly on the substrate 16 and then embedded by applying a molten polymer over the nanostructures, as will be discussed below in reference to zone 52. Electrospinning equipment and processes are known in the art, for example, as disclosed in U.S. Patent Application Publication 2012/0153236, and therefore will not be described in any particular detail here. The electrospinning zone 32 is represented as providing nine nanofiber generators 34 preferably capable of continuously producing nanoscale (about 20 to 500 nanometers) fibers (1D nanomaterials). Each nanofiber generator 34 comprises a spinneret 36 and may potentially deliver different chemical/physical compositions to the liquid polymer film carried by the substrate 16 as it is being transported by the carrier 18 under its spinneret 36. The carrier 18 is preferably electrically conductive so as to be able to serve as a ground in this process. The generators 34 are preferably designed with head pressure control so that as liquid levels in their reservoirs decrease the head pressure can be preferably automatically adjusted so that the diameters of the fibers being produced do not change from the set desired point over long operational times. The nanofiber generators 34 are supported by a platform 38 that preferably rasterizes in a horizontal direction normal to the longitudinal direction of the machine 10 to facilitate uniform coating of the nanofibers onto the substrate 16 and, if present, the liquid polymer film. If the substrate 16 carries the liquid polymer film cast thereon within the unwind and solution casting zone 12, the electrical potential generated by the electrospinning system is preferable able to facilitate the partial or full embedding of the generated nanofibers into the liquid polymer before it solidifies. This capability can lead to a wide range of applications, including reinforcement of gels or membranes such as artificial organs, battery separators, etc. This aspect is illustrated in FIG. 16.

Figure 6:
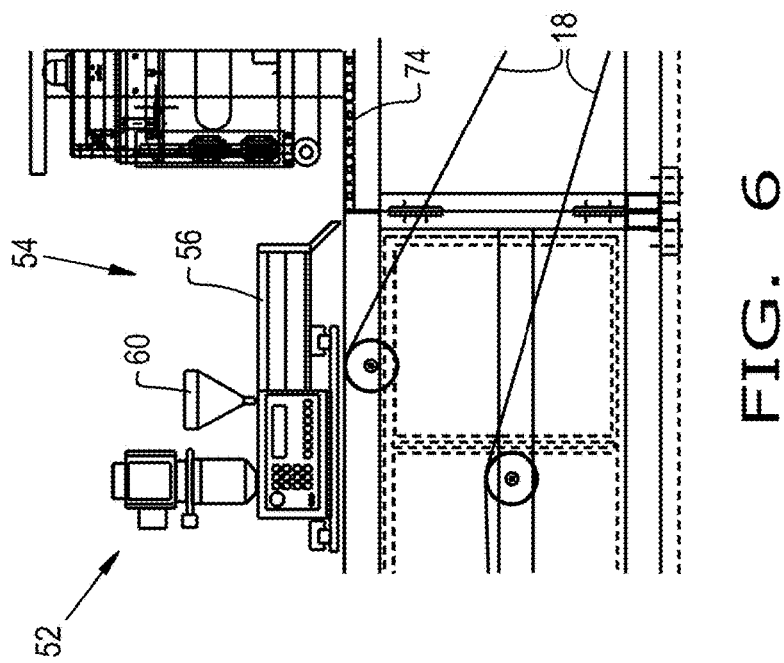
FIGS. 6 and 7 are, respectively, isolated and detailed views of a melt casting zone of the manufacturing machine of FIG. 1.
Figure 7:
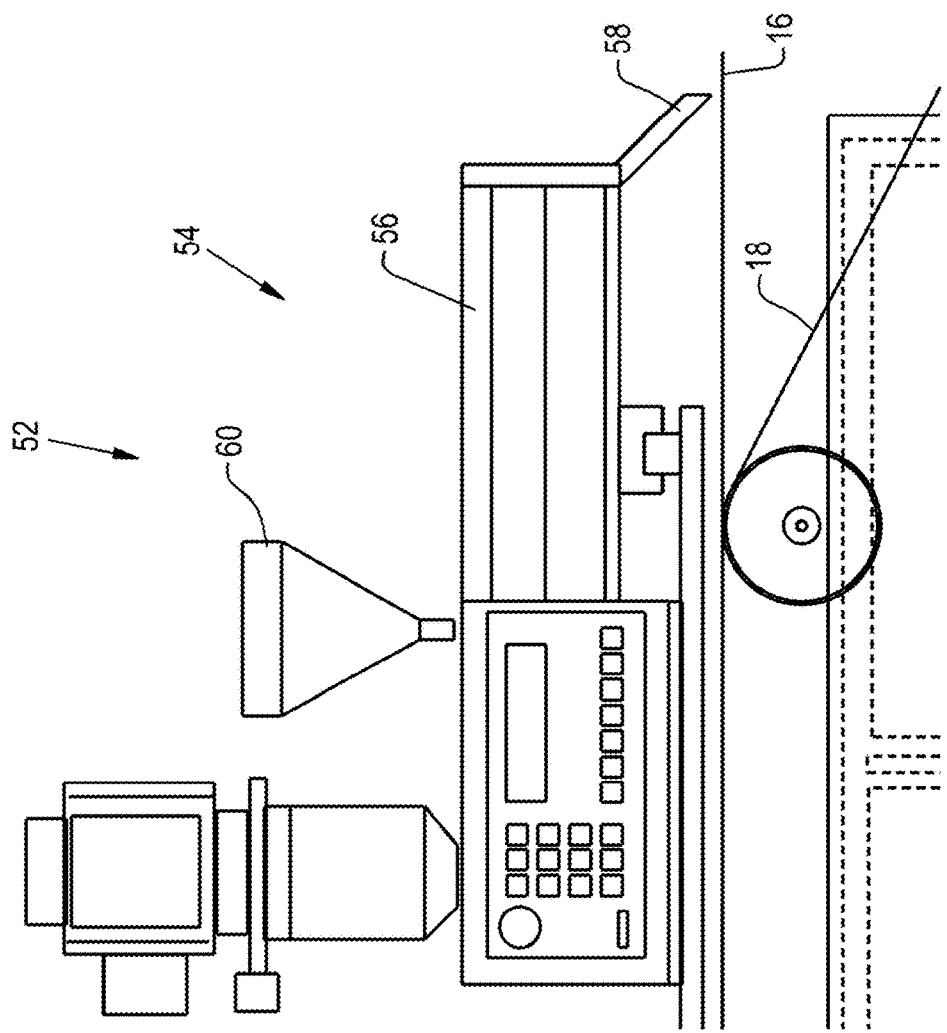

Zone 52 (details of which are shown in FIGS. 6 and 7) is a melt casting zone of the machine 10. FIGS. 6 and 7 depict the melting casting zone 52 as having an extruder 54 connected to a metering pump 56 that delivers precisely metered molten polymer to a casting die 58 to form a thin melt sheet of polymer that can be subsequently processed by one or more downstream zones (FIGS. 8 through 13) adapted to align the nanostructures or phases precompounded with thermoplastic fed to a hopper 60 of the extruder 54. Within the melt casting zone 52, the substrate 16 is maintained at temperatures above the melting temperature of the polymer being deposited. Nonlimiting examples of suitable polymers for this step include thermoplastic polymeric materials that exhibit relatively low(er) melt viscosities when molten either through the use of low molecular weight polymer or polymers that inherently exhibit low melt viscosity. Such polymers may include but are not limited to polyesters (aliphatic or aromatic), polyamides (aliphatic or aromatic), and polyurethanes. A preferred aspect of a selected polymer is that its viscosity is low enough to allow the structures to come together to form z-direction oriented chains in the melt sheet and do not pose undue resistance due to viscous drag during the course of continuous processing. Following deposition of the melt sheet on the nanostructures deposited in the electrospinning zone 32 and, if present. the liquid polymer film optionally deposited in the unwind and solution casting zone 12, the resulting thin polymer film can be maintained at molten conditions so that nanoparticles and/or phases it contains are in a highly mobile environment and external fields can effectively manipulate them, depending on their intrinsic properties (electric, dielectric, magnetic, etc.). Alternatively, melting could be affected and laser local heating subsequently applied (as discussed below).

Figure 9:
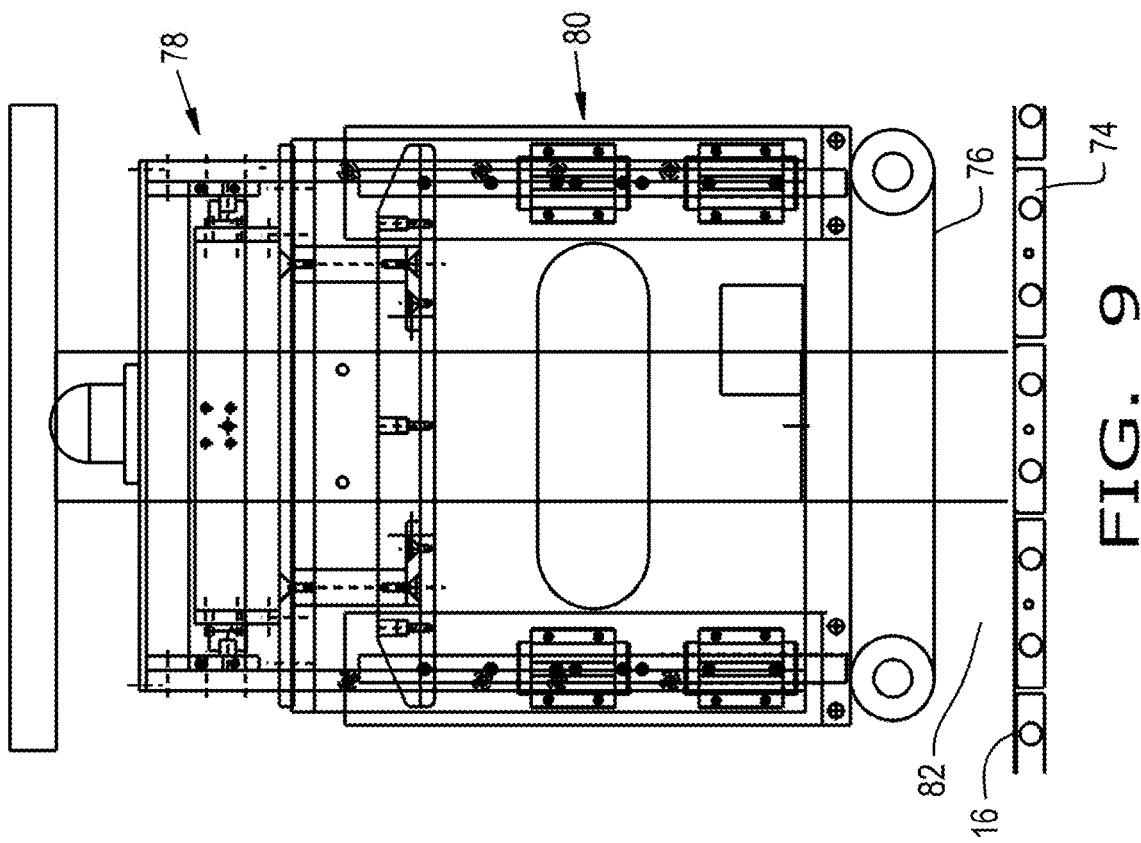
FIGS. 8 and 9 are, respectively, isolated and detailed views of an electric field zone of the manufacturing machine of FIG. 1.
Figure 8:
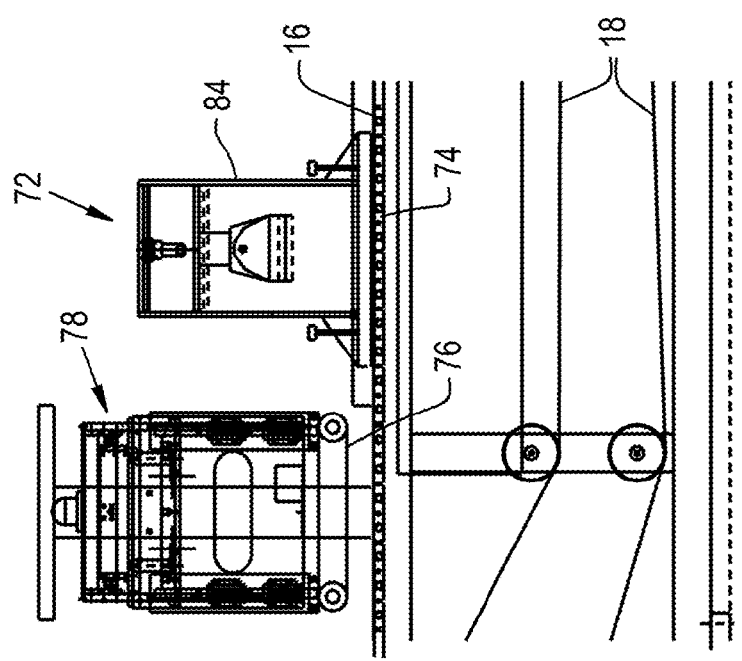

Zone 72 (details of which are shown in FIGS. 8 and 9) is an electric field zone of the machine 10. As shown, the electric field zone 72 is situated above a heated platform 74 and comprises an electrically-conductive roller belt 76 equipped with an internal heating system. The roller belt 76 serves as a high voltage electrode for the electric field applied in the electric field zone 72, and the polymer film on the substrate 16 is subjected to the electric field as a result of the substrate 16 passing between the heated platform 74 and belt 76. The roller belt 76 can preferably be precisely situated with one or more alignment devices 80 to maintain a gap 82 with the substrate 16 at a desired level to very close tolerances. The electric field section 72 also has a precision height adjustment system 78 to control this gap 82. The roller belt 76 applies the electric field to the thin polymer film on the substrate 16 to organize the nanostructures in the thickness ("z") direction of the polymer film. Downstream of the belt 76 and heated platform 74, the electric field zone 72 includes a chiller unit 84 that sufficiently solidifies the thin polymer film to immobilize the organized nanostructures therein. Other aspects of utilizing an electric field to organize nanostructures are generally known in the art, as evidenced by the documents and publications noted above as being incorporated herein by reference.

Figure 15:
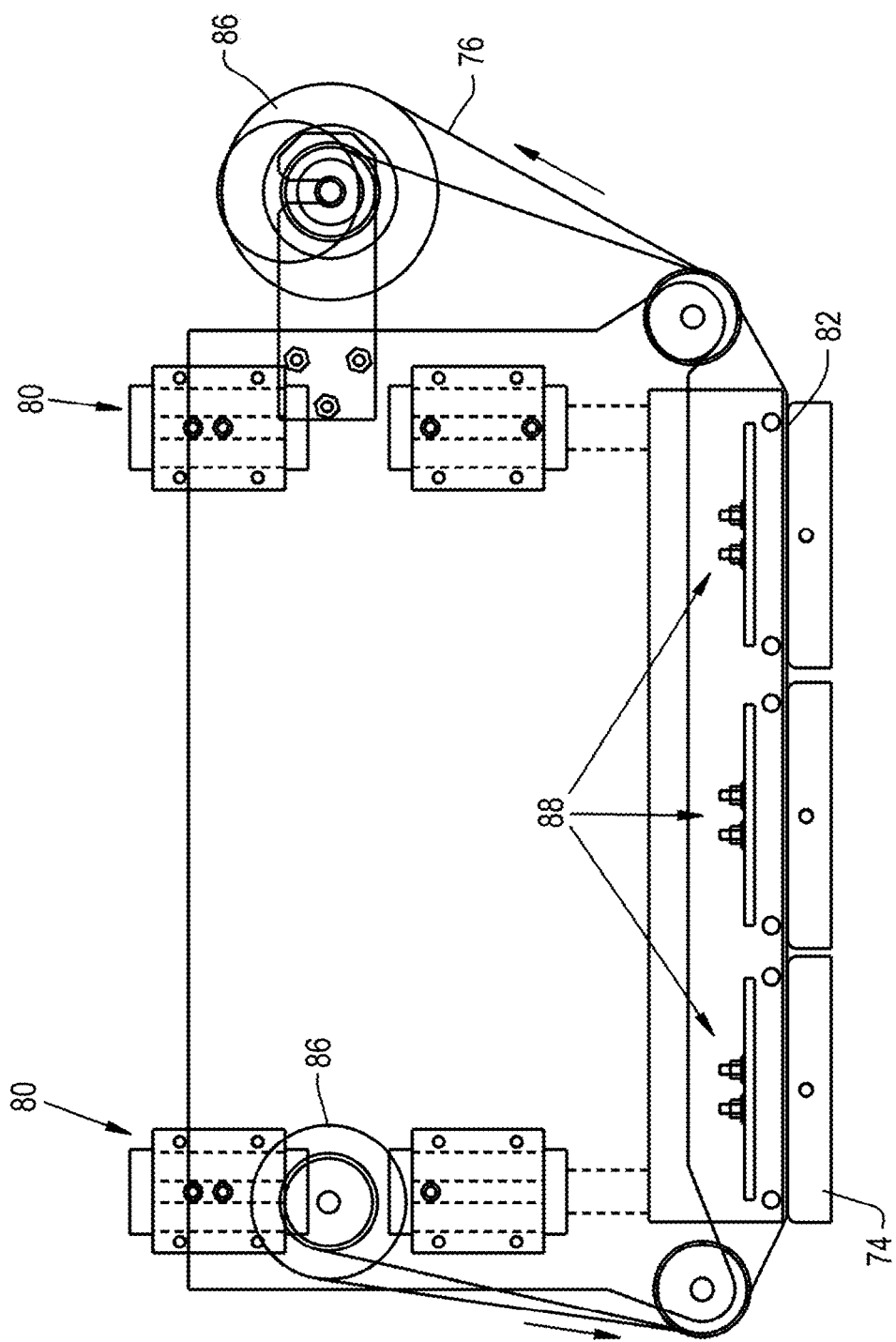
FIG. 15 shows an alternative configuration for the electric field zone depicted in FIGS. 8 and 9.

FIG. 15 depicts another embodiment for implementing electric field alignment within the electric field zone 72. For convenience, identical reference numerals are used in FIG. 15 to denote the same or functionally similar elements described for the electric field zone 72 portrayed in FIGS. 8 and 9. FIG. 15 shows an electrically-conductive roller belt 76 that is dispensed between a pair of spools 86 to pass between the substrate 16 supported on the heated platform 74 and one or more heating units 88 each having an electrically insulating surface facing the belt 76. Alignment devices 80 maintain a gap 82 between the roller belt 76 and substrate 16 at a desired level to very close tolerances. Aspects of the electric field zone 72 shown in FIG. 15 but not discussed in any detail can be, in terms of structure, function, materials, etc., essentially as was described for the electric field zone 72 shown in FIGS. 8 and 9.

Figure 10:
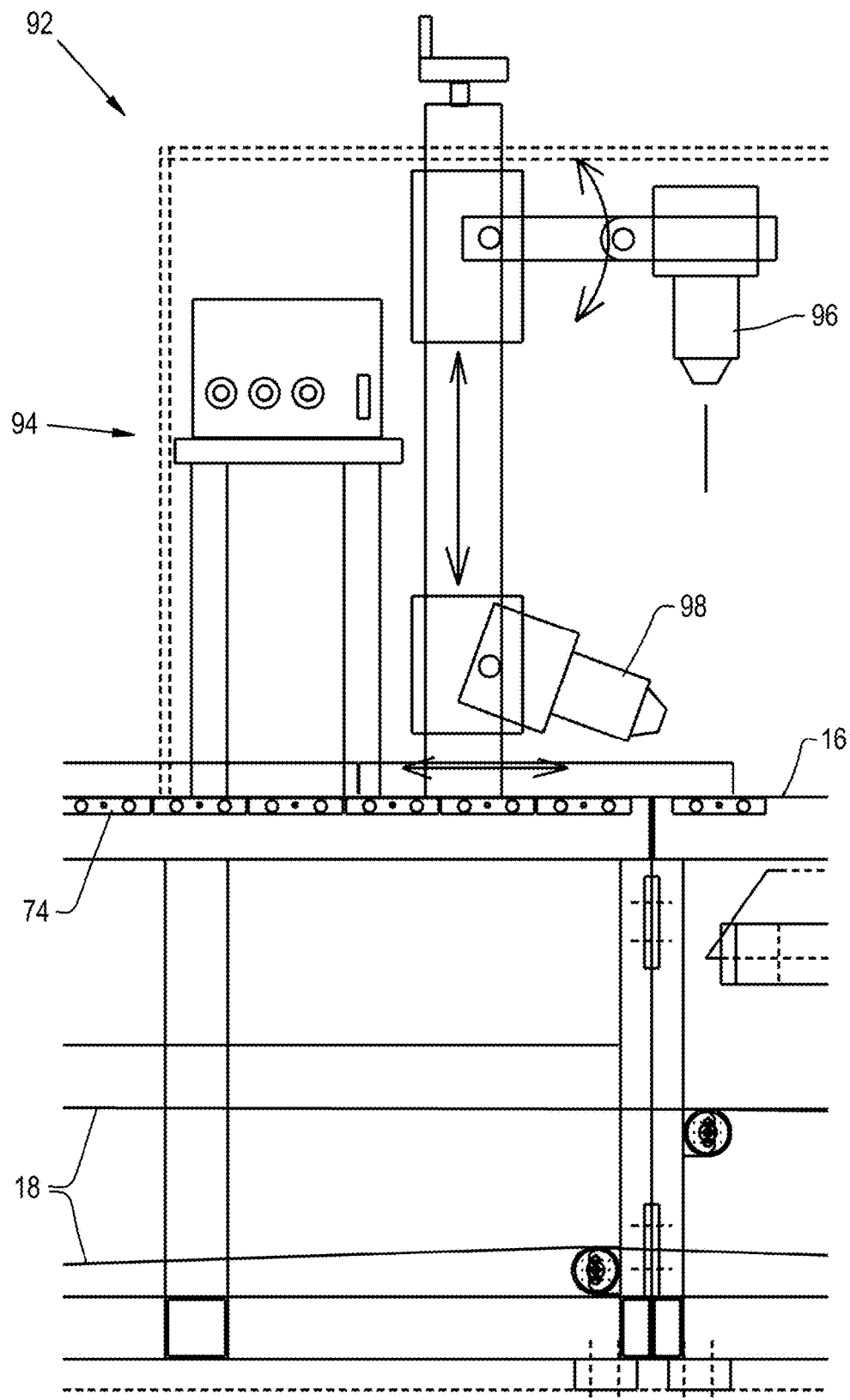
FIGS. 10 and 11 are, respectively, isolated and detailed views of a laser heating section of a laser and magnetic field zone of the manufacturing machine of FIG. 1.
Figure 11:
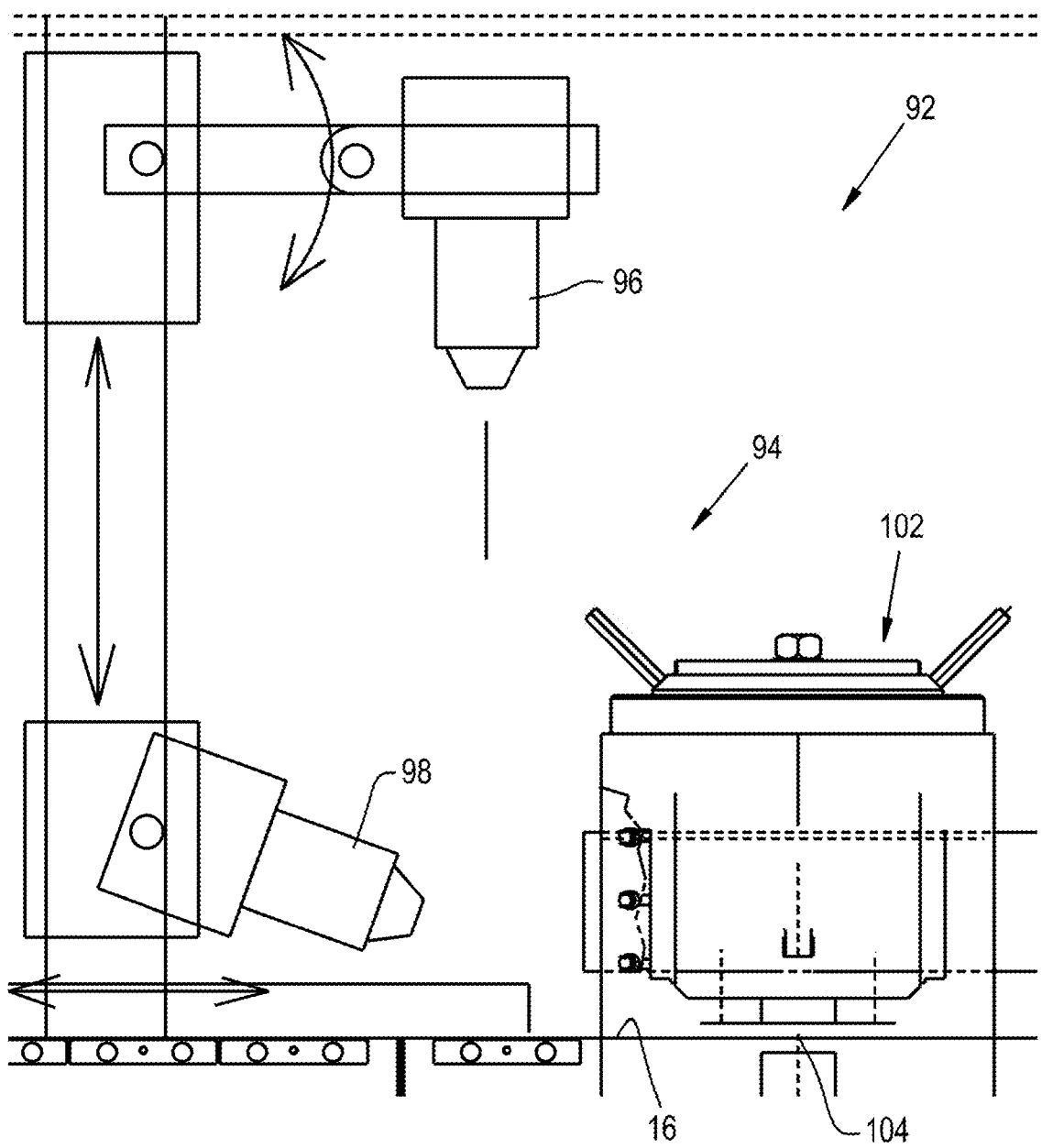
Figure 17:
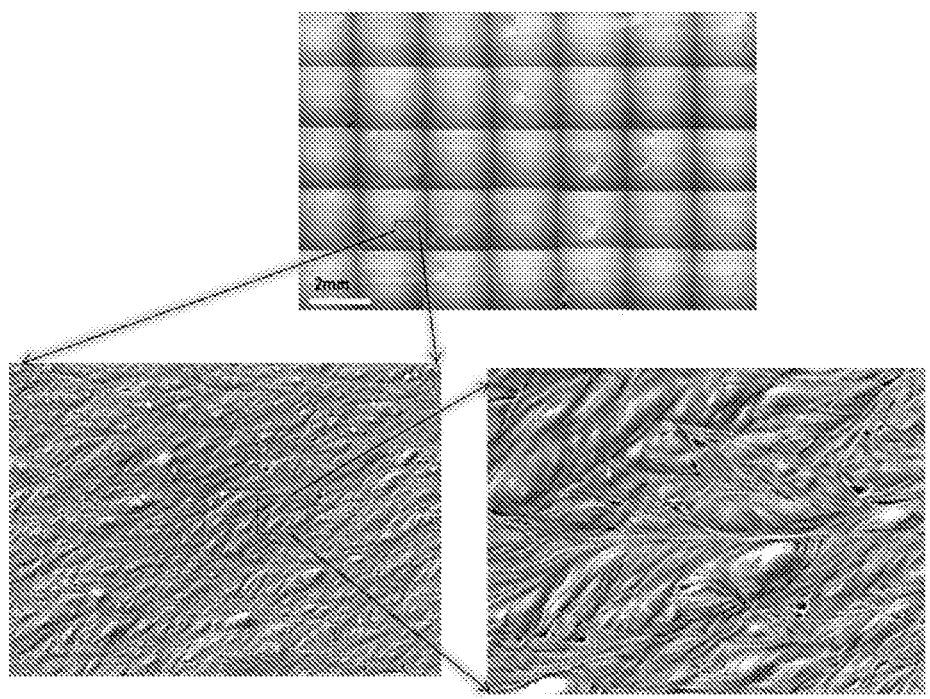

Zone 92 (details of which are shown in FIGS. 10 through 13) is a laser and magnetic field zone that contains a laser heating section 94 of the machine 10 shown in FIGS. 10 and 11. The laser heating section 94 utilizes one or more lasers 96 and 98 having different functions. According to one such function, a laser 96 (e.g., 100W) is oriented in a vertical configuration to scan the thin polymer film passing under the laser 96 at a desired width (normal to the machine direction) to create a rapid temperature increase to melt the thin polymer film. The laser beam generated by the laser 96 may be very narrow (0.5 mm or less in width) and rasterized in a direction normal to the belt propagation direction, and hence create a very narrow strip of molten material. Downstream of the laser 96, the thin polymer film is rapidly cooled with a chiller plate 100 to effect directional crystallization and freezing, resulting in a solidified polymer film with highly directional properties as a result of generated directional morphology. This process preferably produces a desired directional polymer morphology that can be used for a variety of applications. As a nonlimiting example, the thin polymer film may be a precursor capable of being stretched in uniaxial and biaxial modes to produce very unique structural hierarchies that could be beneficial, for example, for use as battery separators or capacitors, or as separation and micro filtration membranes. FIG. 17 illustrates morphologies that can be generated in semicrystalline materials of types that can be produced in this manner. This allows for directional crystallization, reducing crystal interphases such as those between spherulites in normal crystallization, and may help distribute homogeneously defected structures that are typically known to accumulate at boundaries of spherulites. This local rapid heating-cooling process can also be used to orient and organize block copolymers by heating to strategic temperatures (e.g., above the order-disorder transition temperature of the polymer). For example, this type of process can be used to organize cylindrical phases of block copolymers in the thickness direction.

Figure 12:
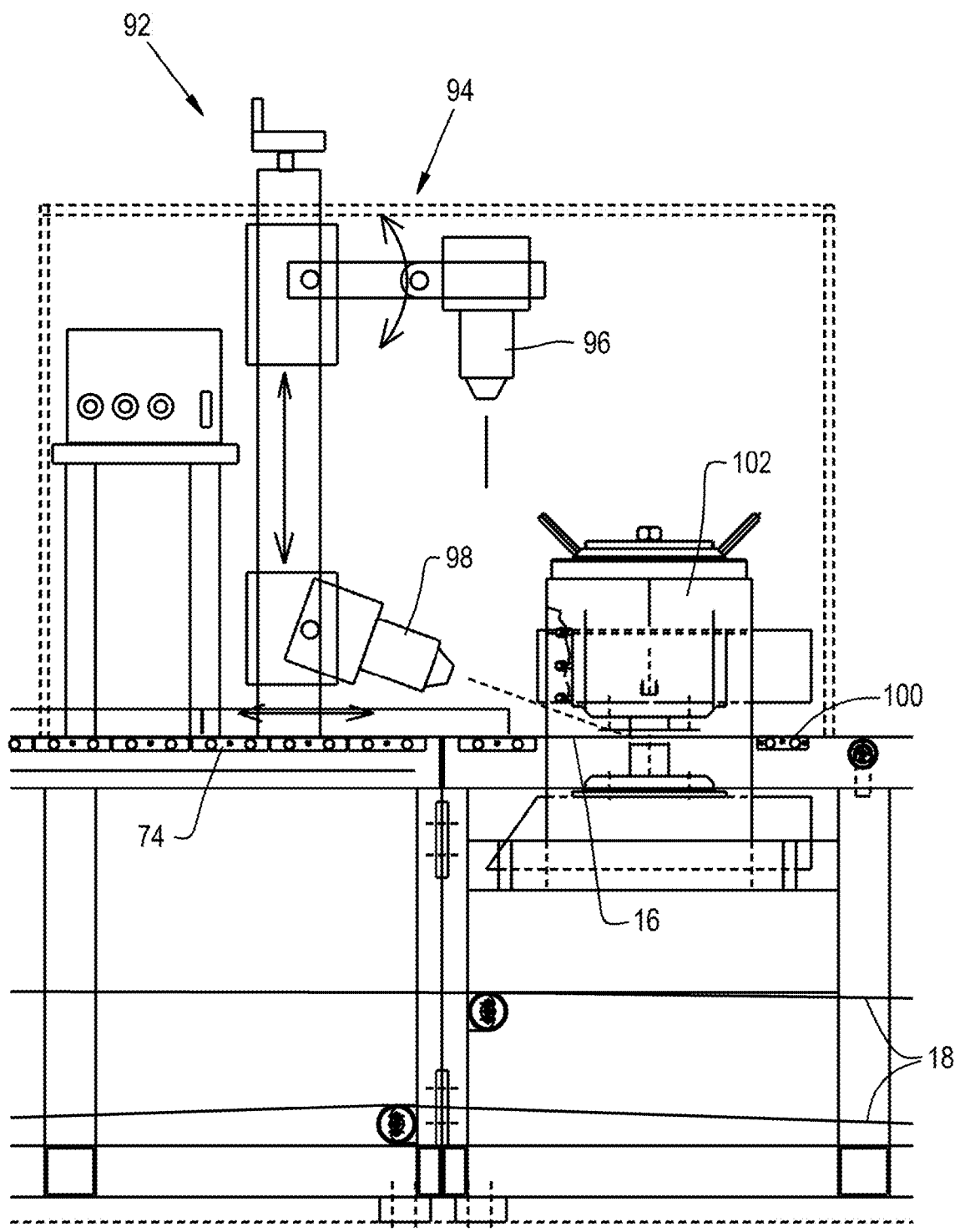
FIGS. 12 and 13 are, respectively, isolated and detailed views of a magnetic field section of the laser and magnetic field zone of the manufacturing machine of FIG. 1.
Figure 13:
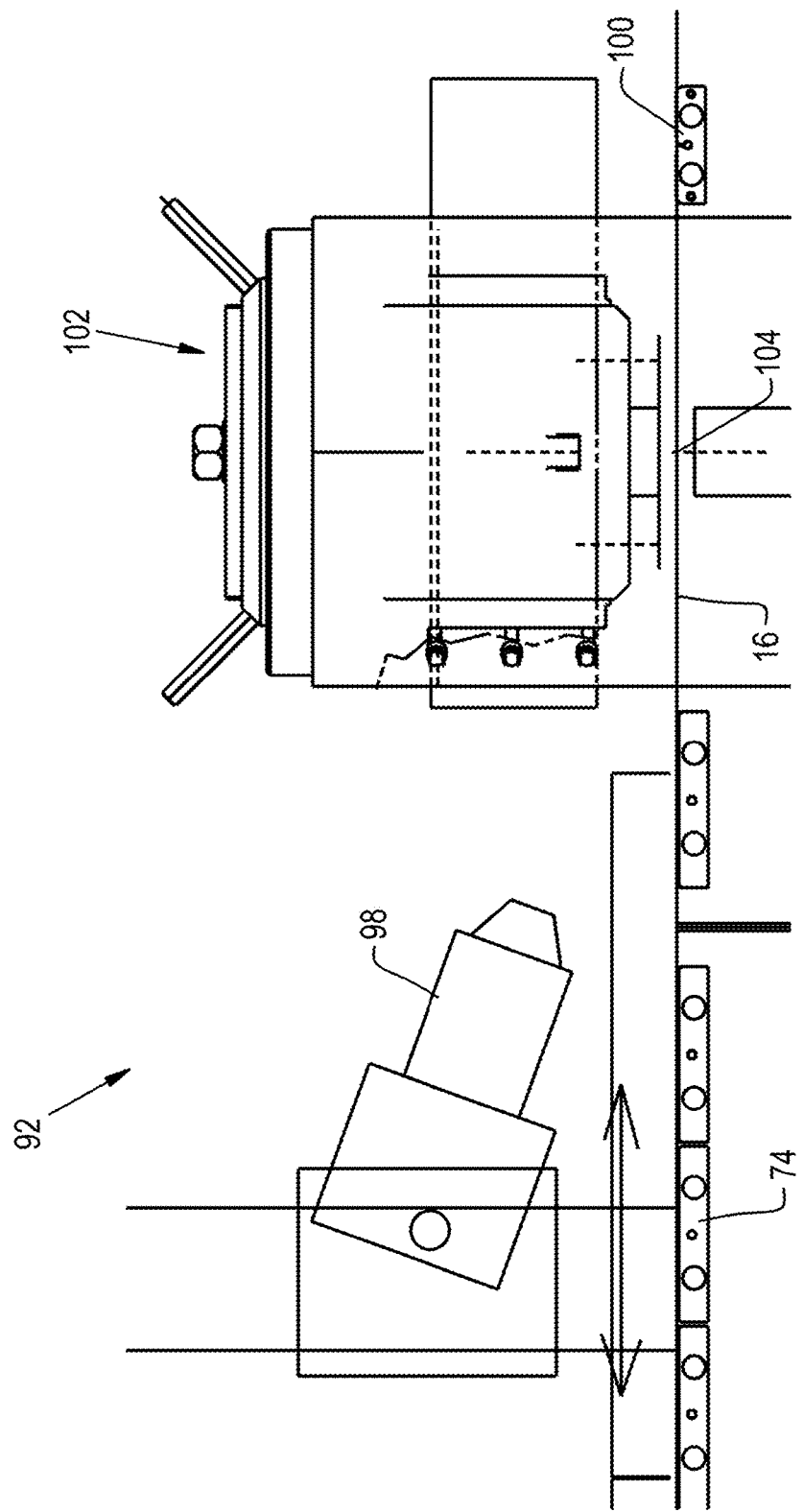

As another or alternative function of a laser, FIGS. 12 and 13 show the laser and magnetic field zone 92 as further containing a laser 98 that is lower and tilted relative to the laser 96 so that it can be preferably directed to the center 104 of a magnetic field generated by a magnet 102, where the strength of the magnetic field is ordinarily at a maximum on the thin polymer film. If the nanostructures dispersed in the thin polymer film are magnetic, the combination of laser heating and the magnetic field facilitates rapid heating and melting of the polymer film to expose the magnetic nanostructures to the maximum magnetic field to simultaneously affect their alignment in the thickness direction of the polymer film. Other aspects of utilizing magnetic fields to organize nanostructures are generally known in the art, as evidenced by the documents and publications noted above as being incorporated herein by reference.

In the applied magnetic field, laser heating is introduced in the manner described to keep the polymer film in a solid state until it is at or near the point or area of maximum field strength of the magnetic field. Unwanted forward transportation would occur if magnetic nanoparticles were in a molten polymer film while approaching a magnet that generates a high magnetic field. By keeping the film in a solid (or at least very high viscosity state) during the approach to the magnet 102, unwanted material transportation and associated instabilities are avoided. With the laser 98 pointing toward the center 104 of the magnetic field, the polymer material can be sufficiently melted to enable the nanoparticles to be organized by the magnetic field prior to the film being cooled to preserve the nanoparticles aligned in nanocolumns in the film.

Though the machine 10 is represented as comprising both electric and magnetic field application sections, either could be eliminated or other means for nanostructure alignment could be devised and used in zones 72 and 92.

FIG. 14 depicts the zone 112 as a thermal treatment zone containing ovens 114 and cooldown sections 116 for heating and cooling the thin polymer film produced in the laser and magnetic field zone 92, and therefore following the organization processes performed in zones 72 and 92. In the particular illustrated embodiment of the machine 10, the thermal treatment zone 112 performs annealing and/or post-curing heating as may be needed, depending on the nature of the polymer materials present in the polymer film. For example, if the polymer film contains a thermally curable monomer, then completion of curing could be affected with any one or more of the ovens 114 in zone 112. In addition or alternatively, the ovens 114 can be used to remove a solvent used to form the polymer film or is otherwise present in the film. The organized and aligned nanostructures within thin polymer films produced with the machine 10 are preferably capable of enhancing one or more functional properties of the films to yield multifunctional polymer films. FIG. 14 further represents subsequent and potentially optional sections of the machine 10 downstream of the thermal treatment zone 112, including a rewind module 118 in which the substrate rewind spool 30 is located.

In view of the above, the roll-to-roll machine 10 represented in FIGS. 1 through 14 is capable of providing a number of desirable features and functions. Melt extrusion is introduced and coupled with external electric field, magnetic field, and/or thermal (laser) treatments in a way that facilitates alignment of nanostructures in the thickness direction of a molten polymer film for continuous nanomanufacturing.

Other desirable features and capabilities of the roll-to-roll machine 10 represented in FIGS. 1 through 14 include the use of laser heating to create directed crystallization and/or organization of copolymers in thin films by melting and/or heating to a specific functional temperature, and then rapidly cooling while the film is continuously cast and taken up at the end of the machine 10. The use of lasers can be more effective to locally heat polymer films, leading to a more efficient generation of desired morphologies in crystalline polymers and copolymers.

The machine 10 represented in the drawings can be adapted for other film processing applications. As a nonlimiting example, the machine 10 can be used to apply a heating-cooling sequence (generally as described above) to films made of block copolymers (e.g., cylindrical phase) that would lead to cylinders being orientation in the thickness direction of the film. This technique can be employed to form films that, if selectively etched, can have controlled porosity for filtration. On the other hand, by incorporating magnetic nanoparticles into the cylindrical columns of the film, the film could be used to store digital information. Certain aspects of such an approach can be realized from Singh, G.; Batra, S.; Zhang, R.; Yuan, H.; Yager, K. G.; Berry, B.; Cakmak, M.; Karim, A., "Large-Scale Roll-to-Roll Fabrication of Vertically Oriented Block Copolymer Thin Films," ACS Nano (2013), 7(6), 5291-5299.

In view of the above, while the invention has been described in terms of a particular embodiment, it should be apparent that alternatives could be adopted by one skilled in the art. For example, the machine 10 and its components could differ in appearance and construction from the embodiment described herein and shown in the drawings, functions of certain components of the machine 10 could be performed by components of different construction but capable of a similar (though not necessarily equivalent) function, and various materials could be processed with the machine 10. In addition, the invention encompasses additional or alternative embodiments in which one or more features or aspects of different disclosed embodiments may be combined. Accordingly, it should be understood that the invention is not necessarily limited to any embodiment described herein or illustrated in the drawings. It should also be understood that the phraseology and terminology employed above are for the purpose of describing the illustrated embodiment, and do not necessarily serve as limitations to the scope of the invention. Therefore, the scope of the invention is to be limited only by the following claims.

The invention claimed is:

1. A roll-to-roll machine comprising:
means for applying a liquid polymer on a substrate to form a liquid polymer film;
means for at least partially embedding nanostructures into the liquid polymer film, the nanostructures being magnetic;
means for melt casting a layer of a molten polymer on the liquid polymer film to produce a thin polymer film;
a carrier that supports and transports the thin polymer film in a propagation direction of the roll-to-roll machine;
means for organizing the nanostructures in a thickness direction of the thin polymer film comprising applying an electric field to the thin polymer film while supported and transported by the carrier;
a chiller unit that sufficiently solidifies the thin polymer film to immobilize the nanostructures therein while the thin polymer film is supported and transported by the carrier;
means for aligning the nanostructures in the thin polymer film downstream of the chiller unit in the propagation direction by simultaneously subjecting the thin polymer film to heat and a magnetic field that aligns the nanostructures while the thin polymer film is supported and transported by the carrier, the aligning means comprising a magnetic field generator that is configured to generate the magnetic field, a first laser configured and aligned to direct a first laser beam onto the thin polymer film at a first location adjacent to and upstream of the magnetic field generator, and a second laser that is configured and aligned tilted at an angle relative to the first laser to direct a second laser beam at a second location within the magnetic field at which the strength of the magnetic field is at a maximum on the thin polymer film, wherein the thin polymer film remains in a solid state until entering the location within the magnetic field, and wherein the aligning means is configured to simultaneously melt the thin polymer film with the second laser beam within the second location and align the nanoparticles in nanocolumns in the thickness direction of the polymer film with the magnetic field within the location; and means for solidifying the thin polymer film to freeze the nanostructures along the nanocolumns in a thickness direction of a solidified polymer film resulting therefrom.

2. The roll-to-roll machine according to claim 1, wherein the solidified polymer film is a multifunctional polymer film.

3. The roll-to-roll machine according to claim 1, wherein the applying means comprises a coating unit comprising multiple doctor blades.

4. The roll-to-roll machine according to claim 1, wherein the embedding means comprises nanofiber generators that continuously produce nanoscale fibers.

5. The roll-to-roll machine according to claim 4, further comprising means for rasterizing the nanofiber generators in a direction normal to a longitudinal direction of the machine.

6. The roll-to-roll machine according to claim 1, wherein the melt casting means comprises an extruder that delivers the molten polymer to a casting die.

7. The roll-to-roll machine according to claim 1, wherein the organizing means comprises a roller belt that serves as a high voltage electrode.

8. The roll-to-roll machine according to claim 7, wherein the carrier-supports the substrate and the thin polymer film thereon and serves as a ground electrode of the organizing means.

9. The roll-to-roll machine according to claim 1, wherein the first laser is configured to direct and rasterize the first laser beam in a direction normal to the propagation direction, and wherein the second laser is configured to direct the second laser beam at the second location within the magnetic field so that the second location is at a center of the magnetic field.

* * * * *